July 11, 1944.  E. GISONDI  2,353,455

FASTENING DEVICE

Filed Jan. 21, 1943  2 Sheets-Sheet 1

INVENTOR.
Emanuel Gisondi
BY Harry Radzinsky
Attorney.

July 11, 1944.   E. GISONDI   2,353,455
FASTENING DEVICE
Filed Jan. 21, 1943   2 Sheets-Sheet 2
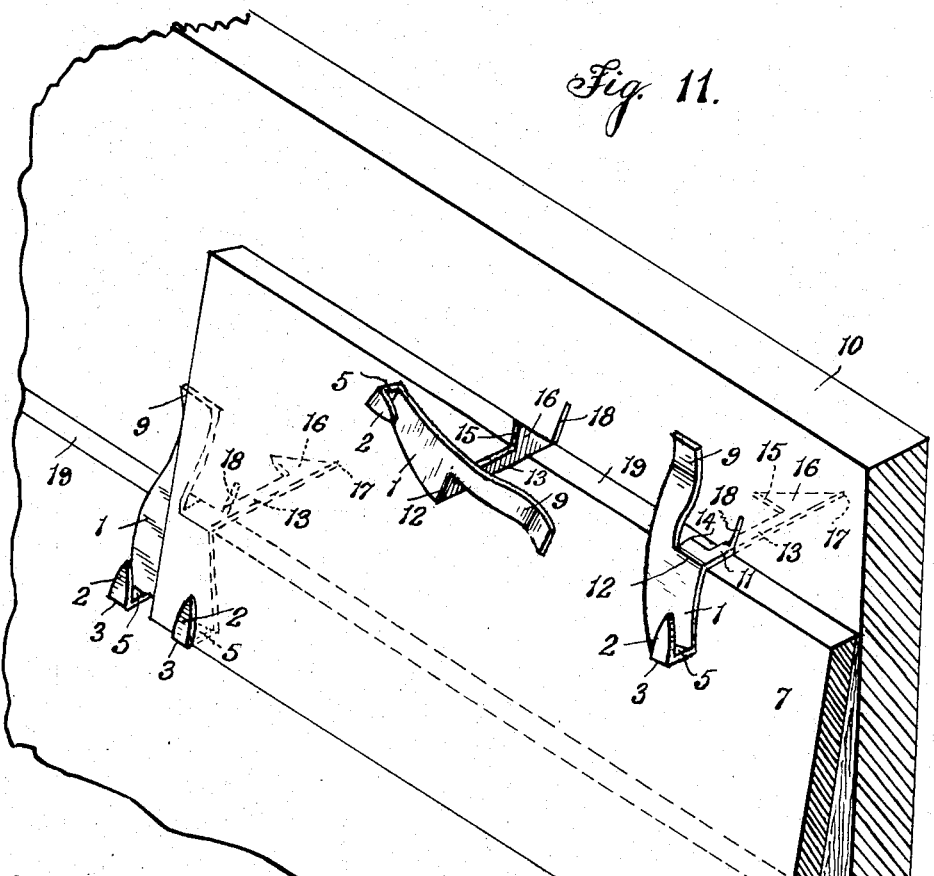
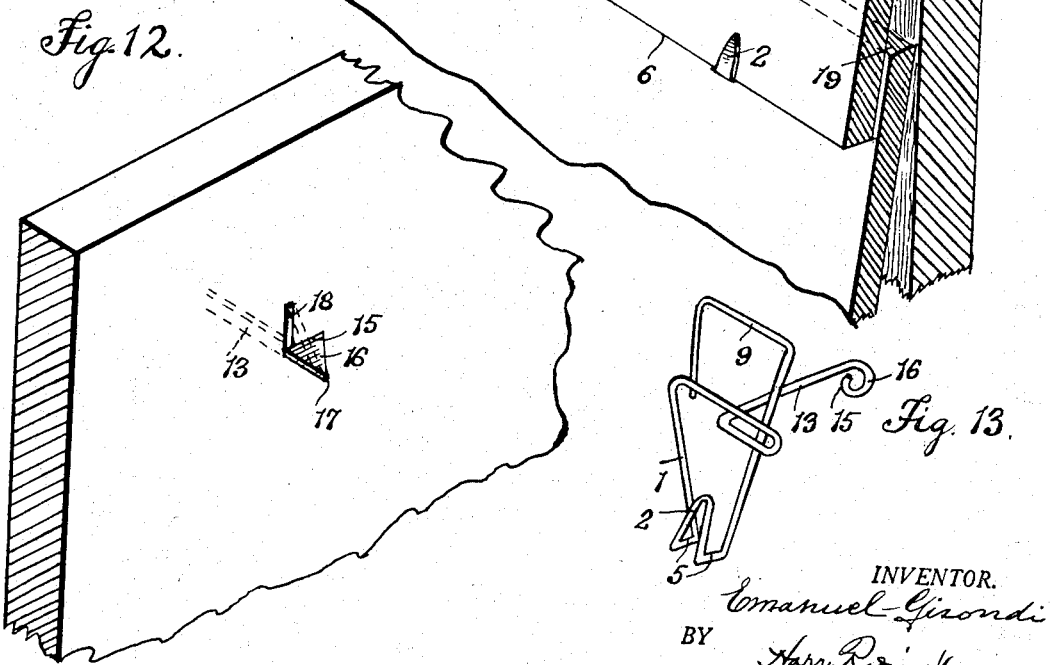
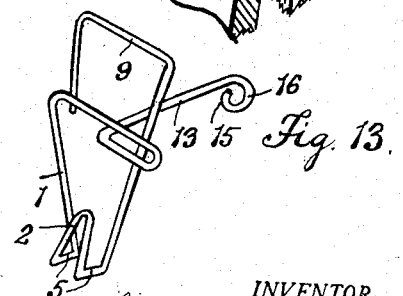
INVENTOR.
Emanuel Gisondi
BY Harry Radzinsky
Attorney Patented July 11, 1944

2,353,455

UNITED STATES PATENT OFFICE 2,353,455

FASTENING DEVICE

Emanuel Gisondi, Larchmont, N. Y.

Application January 21, 1943, Serial No. 473,046

13 Claims. (Cl. 20—0.5)

This invention relates to fastening devices for attaching shingles, siding panels and other outer sheet-like covering material to the walls, roofs or other parts of buildings. The primary object of the invention is to provide a fastening device particularly adaptable for securing shingles, siding or the like to an under material of relatively soft and penetrable nature, such as composition board, the material commonly known as "Celotex" and similar fibre boards, plaster boards and many similar materials to which, at the present time, it is difficult to securely attach the shingles, siding or other outer covering, due primarily to the relatively soft nature of the under material tending to allow nails and other fastening elements to be readily drawn out or displaced.

The present invention contemplates the provision of a fastening means provided with a locking element operative at the rear of the material which it penetrates, to prevent withdrawal of the fastening means.

Another object of the invention is to provide a fastening device which will engage and support shingles, siding and the like in a "floating" manner so that strain on the shingles, siding or the like during expansion and contraction of the material to which they are attached, will be effectively avoided.

Another object of the invention consists in the provision of a fastening device having means by which it may be inserted through a relatively thin and small slit-like opening provided in the sheathing of the building, and then rotated in said opening to cause a head provided on said fastening device to assume a position relative to the opening so that it cannot be passed or drawn out therethrough.

Numerous other objects are accomplished by the invention, a particular description of which appears hereinafter.

Figure 1:
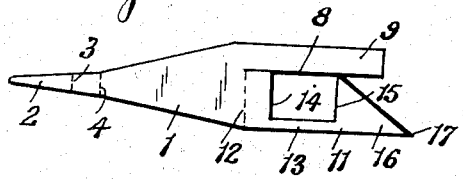
Figure 2:
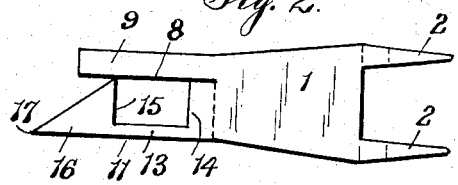
Figure 3:
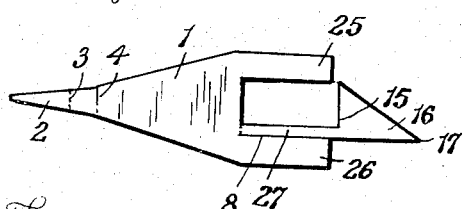
Figure 4:
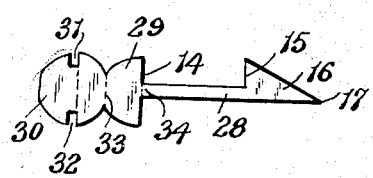
Figure 5:
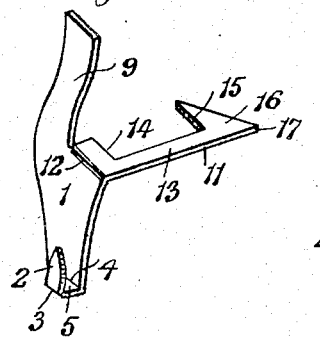
Figure 6:
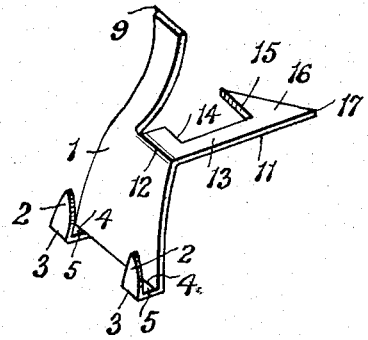
Figure 7:
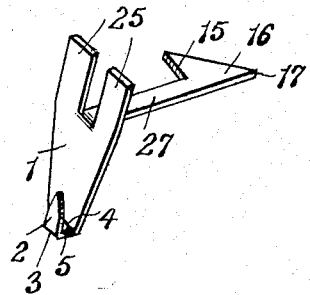
Figure 8:
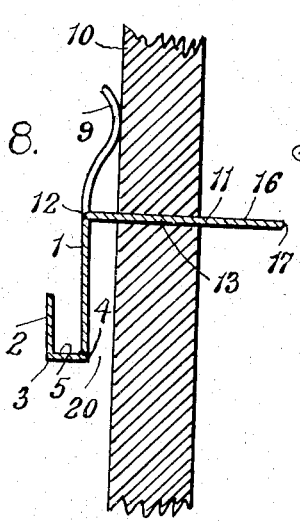
Figure 9:
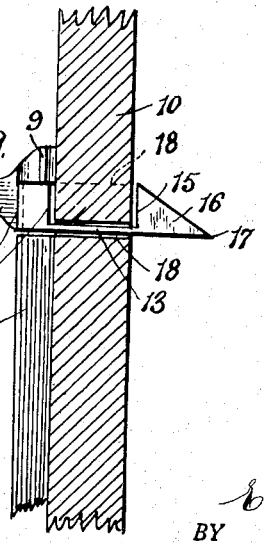
Figure 10:
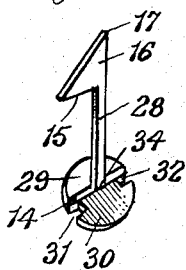

Reference is to be had to the accompanying drawings, forming a part hereof, in which Fig. 1 is a face view of a blank from which a fastening device, of the form shown in Fig. 5 is made; Fig. 2 is a face view of the blank from which a fastening device of the form shown in Fig. 6 is made; Fig. 3 is a face view of a blank from which a fastening device of the form shown in Fig. 7 is made; Fig. 4 is a face view of a blank from which a fastening device of the form shown in Fig. 10 is made; Fig. 5 is a fastening device made from the blank of Fig. 1; Fig. 6 is a fastening device made from the blank of Fig. 2; Fig. 7 is a fastening device made from the blank of Fig. 3; Fig. 8 is a vertical sectional view through a fastener of the type shown in Fig. 5, showing the same as applied to sheathing material and in readiness to receive the shingles, siding or other outer covering; Fig. 9 is a sectional view through a piece of siding and one of the fasteners showing how the fastener is inserted through a slit in the siding above a shingle or section of siding; Fig. 10 is a perspective view of a fastener made from the blank of Fig. 4; Fig. 11 is a perspective view of a portion of a wall, showing several fasteners in position supporting a shingle and showing one fastener about to be inserted through a slit in the sheathing material; Fig. 12 shows the back of a section of sheathing disclosing the position of the pointed or dart-shaped end on one of the fasteners after the fastener has been passed through a slit in the sheathing and then rotated; and Fig. 13 is a perspective view of one of the fasteners as produced from a piece of wire.

In herein describing the improved fastening device, I have particularly pointed out its applicability for attaching shingles, siding and similar sheet material to an under base or sheathing. It is pointed out, however, that I do not necessarily limit my invention to a use in connection with these particular materials since it can be used with entire satisfaction in other environments. As will be hereinafter apparent, the device is so constructed that it may be inserted in position without hammering or the application of extraordinary force and can accordingly be used for securing panels or glass or other frangible material in place. While I have also herein described the fasteners as being made of metal, they can also in some instances, be made of plastic or other suitable materials. Therefore, in herein referring to "shingles, siding or similar materials," I wish to be understood as meaning any suitable material in sheet form or otherwise, which can be held in position by the fastener, and in describing the fastener as being made of sheet metal or formed from wire, I wish to be understood as meaning any suitable material from which the fastener can be readily fabricated.

Referring to the type of fastener shown in Figs. 1 and 5. This fastener, as well as several of the other types disclosed herein, is preferably made from sheet metal or other suitable material which is either non-corrosive or heavily coated with a protective plating or coating to thereby be weather-resistant. The blank shown in Fig. 1 has a body or base portion 1 having its side edges tapering to terminate in a slender tongue 2 which, when bent upon the spaced parallel lines 3 and 4, will form a supporting shelf or hook 5 in which the lower edge 6 of a shingle 7, section of siding or other material will rest, as clearly seen at the right in Fig. 11.

Inwardly from its opposite end, the blank is slit, as indicated at 8, to provide a resilient tongue member 9, curved as clearly seen in Figs. 5 and 8 so that when the fastener is in position, said tongue member 9 will act to apply tension on the fastener, causing the same to hold the portions of the shingles over which it extends tightly against the face of the sheathing 10. The blank also has a prong 11 which is bent at right angles to the body portion 1 of the blank, by being folded along the line 12. The prong 11 has a relatively narrow central shank 13 and at each end of this shank portion are the shoulders 14 and 15 between which the sheathing is situated when the prong 11 has penetrated through the same in a manner to be described. Thus, the shoulders 14 and 15 are spaced apart for a distance slightly greater than the thickness of the sheathing material 10 which the prong 11 must penetrate.

At the outer or free end of the prong 11 is provided a triangular or dart-shaped head or barb 16 terminating in the sharply pointed end 17, the back or rear end of the head consisting of the shoulder 15.

Figs. 8, 9 and 11 clearly show how the fastener is applied in position. The sheathing, indicated at 10, and which is of a penetrable nature, consisting of any of the various boards now commonly used for the purpose, such as that known as "Celotex," gypsum board or the like, is provided by means of a suitable pointed tool with a slit 18 of a length sufficient to permit the passage of the widest portion of the dart-shaped head 16 of prong 11. The slit is made by a suitable tool or implement satisfactory for the purpose, and said slit is produced directly above an applied shingle, as clearly seen in Fig. 11. The slit 18 is preferably made at a slight angle so that when the prong 11 is forced through it, preferably solely by pressure or if necessary, by light blows of a hammer, all parts of the fastener will be located above the top edge 19 of the shingle 7 and the prong 11 can be forced through the slit 18 until the shoulder 14 comes into contact with the outer face of the sheathing 10. This will be noted in Fig. 9 and at the left in Fig. 11. When this has been done, the fastener is then rotated; the narrow shank portion 13 turning readily within the slit 18 until the tongue 9 is vertically disposed and the shelf portion 5 is horizontal. Since the distance between the shoulders 14 and 15 is slightly greater than the thickness of the sheathing, the rotation of the fastener can be effected without the shoulder 15 tearing the paper backing that is usually applied on the inner face of several kinds of composition sheathing. As the rotation of the fastener is performed the body portion 1 of the fastener will ride over the face of shingle 7 and as the space 20 between the back of the body portion 1 of the fastener and the outer face of the sheathing is just sufficient to allow the shingle to be fitted therein with a snug fit, and as the spring tongue 9 is under tension by pressure against the face of the sheathing the body portion 1 of the fastener is resiliently forced inwardly, tending to clamp the upper portion of the shingle 10 tightly between it and the face of the sheathing. When the fastener has been rotated in the manner described, so that it occupies the position shown at the right in Fig. 11, it will be observed that the dart-shaped head 16 occupies a position so that the plane of the head and the shoulder 16 thereon, extends transversely of the slit 18 and the prong is thus locked against withdrawal through the slot. The pressure of the tongue 9 against the face of the sheathing also tends to hold shoulder 15 against the rear face of the sheathing.

The structure shown in Figs. 2 and 6 is similar to that shown in Fig. 1 except that the body portion 1 widens adjacent its lower end and is provided with two of the tongues 2 so that when these tongues are bent on the fold lines 3 and 4, two shingle-supporting shelves 5 will result. This fastener can be used at any point along the length of the shingle, but it is especially applicable at the junction between two shingles since each of the shelves or hooks 5 will engage a part of each of the two abutting shingles. The type of clip shown in Figs. 1 and 5 can be used at an intermediate point along the length of the shingle. The fastening member shown in Figs. 2 and 6 is applied in the same manner as that heretofore described.

The fastener shown in Figs. 3 and 7 is provided with the conventional body portion 1 and supporting shelf 5 similar to the structure of Fig. 1 and at its opposite end the prong 11 is centrally located between the two similar spaced tongues 25 and 26. The fastener of the type shown in Figs. 3 and 7 is one which is adapted to pass through a hole in the shingle. Asbestos shingles, slate shingles and the like are provided with holes through which fastening members are passed and it is through these holes that the prong 27 of Fig. 3 is passed until the body portion 1 and spaced tongues 26 abut against the face of the shingle. Then, by means of a tool inserted between the two spaced tongues 26, the fastening member is rotated to bring shoulder 15 on tongue 26 at an angle to the slit 18 in the manner described in respect to the structure of Fig. 1. Thus, with the structure of Figs. 3 and 7 the prong 27 not only passes through the sheathing 10 but also through the shingle adjacent the upper end thereof and the shelf 5 acts to support the next shingle which is placed over and covers the body portion 1 and tongues 25 and 26 of the fastener.

The structure shown in Figs. 4 and 10 is in the form of a sheet metal nail. The same includes a prong 28 similar to that shown on the fastener of Fig. 1, and having the spaced-apart shoulders 14 and 15 and dart-shaped head 16. The shoulder 14 is formed on a semi-circular head section 29 to which is integrally connected a substantially disc-shaped head 30 provided with diametrically opposite notches 31 and 32. In forming the nail or fastening member of Fig. 10 from the blank shown in Fig. 4, the blank is folded on the line 33 to cause the semi-circular head section 29 to overlie the face of the section 30. The shank 28 is now bent at right angles to the plane of the head section 29 on line 34. The finished fastening member is shown in Fig. 10 where it will be seen that the same consists of a head made up of the overlying sections 29 and 30 from which the integrally formed prong 28 projects. This fastening member is used in the manner similar to the fastening member of Fig. 7. That is to say, the prong 28 is passed through a hole in the shingle and through a slit 18 in the sheathing. A suitable tool is engaged in the notches 31 and 32 of the head and it rotates the fastener to bring the shoulder 15 transversely of the slit 18 through which the prong 28 of the fastener has been forced. This locks the fastener in position so that the head or barb 16 cannot be withdrawn through the slit 18 unless the fastener is manually rotated.

By means of the structures described, it will be seen that I have provided a fastener which can be readily inserted in position through penetrable sheathing and then by simple rotative movement of the fastener, it will be placed in a locked position so that its withdrawal through the sheathing will be effectively prevented. With the types of fastener disclosed in Figs. 5 and 6, the shingles or siding are held in floating relation to the support over which they are placed and they can readily adjust themselves to compensate for expansion and contraction.

The fasteners of Figs. 5, 6 and 7 are described as being made from sheet material. That shown in Fig. 13, and which is operative similar to that of Fig. 5 is bent from a single section of wire and constitutes an effective but inexpensive fastener.

While I have shown and described several embodiments of the invention, it will be obvious that many modifications can be made without departing from the spirit of the invention.

What I claim is:

1. A device for fastening siding, shingles or the like to penetrable sheathing consisting of a clip member having a body disposed on the outside of the sheathing and held flatwisely with respect to the surface of the same and a prong passing through the sheathing, said prong having a head disposed at the back of the sheathing and provided with a shoulder engaging the rear face of the sheathing and preventing withdrawal of the prong through the opening through which it was passed through the sheathing after the prong is rotated in said opening to a position angular to that in which it was passed through the sheathing, and means on the body of the clip for engaging over the top of one shingle to hold it against the sheathing, and engaging below the bottom of another shingle to support the same.

2. A device for fastening shingles or the like to penetrable sheathing comprising a member having a head portion from which a prong projects, said prong having a relatively narrow shank portion terminating in a wider pointed head provided with a shoulder, the length of the shank portion being at least as great as the thickness of the sheathing so that when said prong has been passed through the sheathing the head will be disposed at the back of the sheathing and the shoulder will, on rotation of the prong within the opening in the sheathing through which it was passed, be disposed against the back of the sheathing, and means on the lower end of said head portion for engaging below and supporting a shingle.

3. A device for fastening shingles or the like to penetrable sheathing comprising a base plate provided with an upturned lip fitting over the lower edge of a shingle, said base plate having a rearwardly bent prong penetrating the sheathing, said prong being notched to provide spaced shoulders between which the sheathing is disposed when the prong is passing through the same, one of said shoulders constituting an edge of a pointed and enlarged head located at one end of the prong, the second shoulder constituting means for spacing the base plate from the sheathing for a distance substantially equal to the thickness of a shingle, whereby a shingle may be inserted between the back of the base plate and the outer face of the sheathing, and a tongue extending from the base plate and bearing against the face of the sheathing to thereby cause the base plate to be held resiliently against the shingle that is disposed between it and the sheathing.

4. A fastener of the character described comprising, a base adapted to confine a portion of a lower shingle, siding or the like between it and sheathing, said base being provided with an upturned lip for supporting the lower edge of an upper shingle, the base being provided with a rearwardly extended prong passing through a slit in the sheathing and having a head exposed at the back thereof, said head being of greater width than the portion of the prong disposed in the slit and arranged to be disposed with its plane at an angle to the length of the slit when the fastener is in shingle-supporting position so that the head cannot be passed through the slit while the fastener remains in such position.

5. A fastener of the character described comprising, a base, a sheet metal prong extending rearwardly therefrom and adapted to pass through a slit in sheathing, a head on the free end of the prong and formed with a shoulder on its inner end, the prong being inserted through the slit and the fastener then rotated to cause the shoulder on the head to extend across the slit so that retracting movement of the prong through the slit without return rotative movement of the fastener is impossible, the base being provided with supporting means for engaging the lower end of a shingle and also having a resilient tongue for urging said base toward a shingle confined between it and the face of the sheathing.

6. A fastener of the character described comprising, a sheet metal member having an upturned lower end for supporting the lower end of a shingle or the like, said member also confining the upper portion of a lower shingle or the like between it and the face of sheathing, a tongue extending upwardly from said member and resiliently bearing against the face of the sheathing above the lower shingle and urging the member against said shingle, a prong extending rearwardly from the member and passing through a slit in the sheathing above the upper edge of the lower shingle, said prong having a narrow shank portion and spaced shoulders at the opposite ends of said shank portion, the outermost shoulder constituting the inner termination of a pointed head formed on the prong, said shoulder being adapted to be disposed crosswisely of the slit in the sheathing when the member is in shingle-supporting position so that the head cannot be drawn through the slit.

7. A fastener for shingles and the like having a head for confining a lower shingle between it and sheathing, said head having a prong adapted to be forced through a substantially vertically disposed slit in sheathing, said prong having a head formed with a shoulder disposed crosswisely of the slit when the prong is rotatively moved within the slit, the latter position of the shoulder being reached when the fastener is placed in shingle-supporting position, and means on the head for engaging and supporting an upper shingle in overlapping relation to the lower shingle.

8. A fastener for shingles comprising a nail having a shank terminating in a substantially triangular end, said shank being of thin and flat cross-sectional shape, whereby the same may be inserted through a substantially narrow slit in sheathing, a relatively flat head formed integrally with the shank and provided with means by which it may be engaged by a tool and the nail rotated to cause the end of the shank to be disposed with its plane at an angle to the length of the slit.

9. A fastener of the character described comprising, a base portion, a prong extending rearwardly of the same and provided with a barb on its end adapted to pass through a slit in sheathing, and an upturned lip on the base portion for the support of a shingle after the prong has been passed through the slit until the barb is behind the sheathing and rotated until the barb is disposed angularly with respect to the slit.

10. In a fastener of the character described, a base member, a barbed prong thereon passing through a slit in sheathing until a barb on said prong is wholly disposed at the back of the sheathing, said fastener being then rotated to cause the barb to be angularly disposed relatively to the slit and thereby prevented from withdrawal through the slit, means on the base for engaging below and supporting a shingle, and resilient means on the base for urging the barb against the rear face of the sheathing.

11. A sheet metal fastener for shingles or the like comprising, a flat sheet metal head arranged for flatwise disposition against the face of a shingle and adapted to be covered by an adjacent shingle, a prong formed integrally with the head and disposed angularly to the plane of the head, said prong having an enlarged end located remotely from the head and constituting an integral continuation of the prong and disposed in the same plane whereby said enlarged end can be passed through a slit in the sheathing and then bodily rotated to position the enlarged end angularly in respect to the slit and prevent its withdrawal therethrough.

12. A sheet metal fastener for shingles and the like comprising, a head portion for flatwise disposition relative to sheathing to which the shingles are to be secured, said head portion having an integral, rearwardly extended, barbed-end prong for penetration through a slit in the sheathing and for rotation in the slit to position the barb angularly with respect to the slit, a stop on said prong for abutment against the outer face of the sheathing to thereby hold the head portion properly spaced from the face of the sheathing to enable a shingle to be positioned between said head portion and the sheathing, one end of said head portion having a termination extending outwardly and upwardly to form a shelf for receiving and supporting a second shingle which overlaps a part of the first shingle and extends over and conceals the major part of said head portion.

13. A sheet metal fastener for shingles and the like comprising, a head portion for flatwise disposition relative to sheating to which the shingles are to be attached, said head portion having an integral, rearwardly extended, barbed-end prong for penetration through a slit in the sheathing and for rotation in the slit to position the barb angularly with respect to the slit, a stop on said prong for abutment against the outer face of the sheathing to thereby hold the head portion properly spaced from the face of the sheathing to enable a shingle to be positioned between said head portion and the sheathing, one end of said head portion having a termination extending outwardly and upwardly to form a shelf for receiving and supporting a second shingle which overlaps a part of the first shingle and extends over and conceals the major part of said head portion, the other end of the head portion being provided with a resilient tongue operative against the face of the sheathing to urge the head portion resiliently against the shingle that is confined between it and the sheathing.

EMANUEL GISONDI.